(12) United States Patent
Wischmeyer (10) Patent No.: US 6,480,770 B1
(45) Date of Patent: Nov. 12, 2002

(54) PAR SYSTEM FOR ANALYZING AIRCRAFT FLIGHT DATA

(75) Inventor: Ed Wischmeyer, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/541,474

(22) Filed: Mar. 31, 2000

Related U.S. Application Data (60) Provisional application No. 60/127,373, filed on Apr. 1, 1999.

(51) Int. Cl.[7] .................................................. G06G 7/76
(52) U.S. Cl. ............................. 701/29; 701/13; 701/14; 701/35
(58) Field of Search ............................. 701/29, 13, 14, 701/35, 15, 16

(56) References Cited

U.S. PATENT DOCUMENTS

| | | | | |
|---|---|---|---|---|
| 4,604,711 A | * | 8/1986 | Benn et al. | 701/14 |
| 4,729,102 A | * | 3/1988 | Miller, Jr. et al. | 701/14 |
| 4,943,919 A | * | 7/1990 | Aslin et al. | 701/3 |
| 5,585,791 A | * | 12/1996 | Paterson et al. | 340/970 |
| 5,761,625 A | * | 6/1998 | Honcik et al. | 701/14 |
| 6,092,008 A | * | 7/2000 | Bateman | 701/14 |
| 6,219,626 B1 | * | 4/2001 | Steinmetz et al. | 702/183 |

OTHER PUBLICATIONS

Moran et al., In–Flight Analysis of Enabling Technology, IEEE; pp. 333–342, 1997.*

Dudolsky, Enhanced C–17 0–Levell QAR Data Processing and Reporting, IEE; pp 44–51, 1997.*

* cited by examiner

Primary Examiner—William A. Cuchlinski, Jr.
Assistant Examiner—Marthe Y. Marc-Coleman (57) ABSTRACT

A system for analyzing aircraft data includes the steps of identifying a domain comprising sets of data, calculating ranges of typical values for components of the sets of data within the domain, and determining atypical components for each set of data within the sets of data based on the range of typical values calculated in the calculating step. A pre-cursor pattern to an exceedance event is determined by (a) identifying exceedance sets of data within the domain corresponding to an exceedance event, and (b) identifying common atypicalities of the exceedance sets of data. Mitigating factors for an exceedance event are determined by (a) identifying non-event sets of data within the domain in which atypicalities resembling the pre-cursor pattern exist but in which the exceedance event does not occur, and (b) identifying common atypicalities of the non-event sets of data as the mitigating factors. The consequences of an event are determined by (a) identifying event sets of data corresponding to the event, and (b) comparing the atypicalities of the event sets of data with the typical values, where the consequences are the common atypicalities of the event sets of data. Mitigating factors for the consequences of the event are determined by (a) chronologically sorting the common atypicalities of the event sets of data, and (b) identifying pairings of atypicalities comprising a mitigation and a consequence, where a mitigating factor is a mitigation that occurred when a later consequence usually did not occur or is a mitigation that did not occur when a later consequence usually did occur.

36 Claims, 5 Drawing Sheets

| | A | B | C | D | E | F | G |
|---|---|---|---|---|---|---|---|
| 1 | ATYPICALITY VECTOR COMPONENTS | FLIGHT 100 | FLIGHT 101 | FLIGHT 102 | FLIGHT 103 | FLIGHT 104 | FLIGHT 105 |
| 2 | AIRSPEED HIGH AT 1500 FEET | 0 | 1 | 0 | 0 | 1 | 0 |
| 3 | AIRSPEED LOW AT 1500 FEET | 0 | 0 | 0 | 1 | 0 | 0 |
| 4 | AIRSPEED HIGH AT 500 FEET | 0 | 0 | 0 | 0 | 0 | 0 |
| 5 | AIRSPEED LOW AT 500 FEET | 0 | 0 | 0 | 1 | 0 | 0 |
| 6 | AIRSPEED HIGH AT 100 FEET | 0 | 0 | 1 | 0 | 0 | 1 |
| 7 | AIRSPEED LOW AT 100 FEET | 0 | 0 | 0 | 1 | 0 | 0 |
| 8 | AIRSPEED HIGH AT 50 FEET | 1 | 0 | 0 | 0 | 0 | 1 |
| 9 | AIRSPEED LOW AT 50 FEET | 1 | 0 | 0 | 1 | 0 | 0 |
| 10 | FLAP DEFLECTION HIGH AT 1500 FEET | 0 | 0 | 1 | 0 | 0 | 0 |
| 11 | FLAP DEFLECTION LOW AT 1500 FEET | 0 | 0 | 0 | 0 | 0 | 1 |
| 12 | FLAP DEFLECTION HIGH AT 500 FEET | 0 | 0 | 0 | 0 | 1 | 0 |
| 13 | FLAP DEFLECTION LOW AT 500 FEET | 0 | 1 | 0 | 0 | 0 | 0 |
| 14 | FLAP DEFLECTION HIGH AT 100 FEET | 0 | 0 | 0 | 0 | 0 | 0 |
| 15 | FLAP DEFLECTION LOW AT 100 FEET | 0 | 0 | 0 | 1 | 0 | 0 |
| 16 | FLAP DEFLECTION HIGH AT 50 FEET | 0 | 0 | 0 | 0 | 0 | 0 |
| 17 | FLAP DEFLECTION LOW AT 50 FEET | 0 | 1 | 0 | 1 | 0 | 0 |
| 18 | | | | | | | |
| 19 | ATYPICALITY (NUMBER OF 1 IN THIS FLIGHT'S ATYPICALITY VECTOR) | 2 | 3 | 2 | 6 | 2 | 3 |
| 20 | IS FLIGHT ATYPICAL WITHIN THIS DOMAIN? | | | | YES | | |
| 21 | | | | | | | |
| 22 | DID FLIGHT HAVE A HARD LANDING? (DETERMINED OUTSIDE THE PAR ALGORITHM) | 1 | | | 1 | | |
| 23 | WAS FLIGHT AT RISK (DID IT HAVE LOW AIRSPEED AT 50 FEET?) | 1 | | | 1 | | |
| 24 | WAS FLIGHT AT RISK, BUT DID NOT HAVE A HARD LANDING? | | | | | | |

Fig. 2B.

| R | S | T | U | V | W | X | Y | Z | AA | AB | AC | AD | AE |
|---|---|---|---|---|---|---|---|---|----|----|----|----|----|
| | | | | | | | | | | | NUMBER OF FLIGHTS ATYPICAL IN THIS MEASUREMENT | PRE-CURSORS: HOW MANY FLIGHTS WITH HARD LANDINGS WERE ATYPICAL IN THIS MEASUREMENT? | POSSIBLE MITIGATING CIRCUMSTANCES |
| FLIGHT 116 | FLIGHT 117 | FLIGHT 118 | FLIGHT 119 | FLIGHT 120 | FLIGHT 121 | FLIGHT 122 | FLIGHT 123 | FLIGHT 124 | FLIGHT 125 | | | | |
| 0 | 0 | 0 | 0 | 1 | 0 | 0 | 0 | 0 | 1 | | 5 | 0 | 2 |
| 1 | 0 | 0 | 0 | 0 | 1 | 0 | 0 | 1 | 0 | | 5 | 1 | 0 |
| 0 | 1 | 1 | 0 | 0 | 1 | 0 | 0 | 0 | 0 | | 5 | 0 | 0 |
| 0 | 0 | 0 | 1 | 0 | 0 | 0 | 1 | 0 | 0 | | 5 | 1 | 0 |
| 0 | 0 | 0 | 0 | 1 | 0 | 1 | 0 | 0 | 0 | | 5 | 0 | 1 |
| 1 | 0 | 0 | 0 | 0 | 0 | 0 | 1 | 0 | 0 | | 5 | 1 | 0 |
| 0 | 0 | 0 | 0 | 0 | 1 | 0 | 0 | 0 | 0 | | 5 | 1 | 0 |
| 0 | 0 | 0 | 0 | 1 | 0 | 0 | 0 | 0 | 1 | | 5 | 3 | N/A |
| 0 | 0 | 1 | 1 | 0 | 0 | 0 | 0 | 0 | 0 | | 5 | 0 | 0 |
| 0 | 0 | 0 | 0 | 0 | 0 | 0 | 0 | 1 | 0 | | 5 | 1 | 0 |
| 0 | 0 | 0 | 0 | 1 | 0 | 0 | 0 | 0 | 1 | | 5 | 0 | 2 |
| 0 | 0 | 1 | 0 | 0 | 0 | 1 | 0 | 0 | 0 | | 5 | 0 | 0 |
| 0 | 1 | 0 | 0 | 1 | 0 | 0 | 0 | 0 | 0 | | 5 | 0 | 1 |
| 0 | 0 | 0 | 0 | 0 | 0 | 1 | 0 | 1 | 0 | | 5 | 1 | 0 |
| 0 | 1 | 0 | 0 | 0 | 0 | 0 | 1 | 0 | 0 | | 5 | 0 | 0 |
| 1 | 0 | 0 | 1 | 0 | 0 | 0 | 0 | 0 | 0 | | 5 | 1 | 0 |
| | | | | | | | | | | | | | |
| 3 | 3 | 3 | 3 | 5 | 3 | 3 | 3 | 3 | 3 | | | | |
| | | | | YES | | | | | | | | | |
| | | | | | | | | | | | | | |
| | | | | | | | | | | | | | |
| | | | | 1 | | | | | 1 | | | | |
| | | | | | | | | | | | | | |
| | | | | 1 | | | | | 1 | | | | | ized data for analysis and to manually
PAR SYSTEM FOR ANALYZING AIRCRAFT FLIGHT DATA

CROSS-REFERENCE TO RELATED APPLICATION

This application claims the benefit of provisional application No. 60/127,373, filed Apr. 1, 1999.

BACKGROUND OF THE INVENTION

1. Field of the Invention

The invention relates generally to a system for analyzing data of a repetitive occurrence, such as aircraft flights. More particularly, the invention relates to a system for determining atypical flight characteristics and for using these atypical flight characteristics to determine pre-cursors to certain events, the risk of the occurrence of an event, and the consequences resulting from a certain event. Mitigating factors that avoid the occurrence of an event, or the consequences of an event, are also determined. The information obtained in the PAR (Pre-cursors, Atypicality, and Risk analysis) system is used to identify aircraft flights that are at risk of being in an accident or incident, or of having some other phenomenon occur.

In accordance with the present invention, in a defined set of flights, or domain, an atypicality vector is determined for each flight by evaluating parameters of a flight for deviation from the norm (atypicality). For a set of flights within the domain having a certain "exceedance event," i.e., a detected violation of standard operating procedure, common vector components of the atypicality vectors indicate pre-cursors to the exceedance event. Flights that most closely resemble the precursor pattern are at a higher risk of encountering the exceedance event. Mitigating factors are determined by examining the atypicality vectors of flights closely matching the pre-cursor pattern but not encountering the exceedance event. Consequences of an event are determined by evaluating the portion of the atypicality vector corresponding to measurements made after the occurrence of the event. Mitigating factors for the consequences are determined by examining the atypicality vectors of flights closely matching the consequences pattern but not encountering the consequences.

2. Description of the Related Art

Efforts to identify flights that are at risk of being in an accident or incident are known. In analyzing data for repetitive occurrences, for example aircraft flights, pre-defined criteria for judging a flight are normally used to detect an "exceedance event." However, those criteria frequently do not measure all hazards to the successful completion of the flight.

A known technique to help identify unknown hazards to the successful completion of a flight is to identify flights that are atypical. These atypical flights have characteristics that may not be obvious, but which separate them from the majority of typical flights. Once atypical flights are identified, it is standard practice to identify factors that made those flights atypical, and to decide if those factors are symptoms of a hazard to flight or are symptoms of some other phenomenon. Other flights that are at risk can be identified by using those symptoms.

Singular value decomposition (SVD) and principal axis analysis are techniques that are currently known in the art to evaluate data in relation to the predefined criteria discussed above. These techniques can find data points that are within the normal range of individual tests but that are outliers when viewed with an appropriate coordinate transformation. However, the present state of the art has numerous limitations. While these techniques are able to determine if data is different, they are not able to tell you why the difference occurred or whether the difference matters. The techniques mentioned above are also slow, expensive, and tedious. For example, singular value decomposition requires the collaboration of a research scientist and a knowledge domain expert to identify resources in both a knowledge domain and an analysis domain and to interpret the data. The process requires time to format the data for analysis and to manually iterate, generate, identify, and classify phenomena as benign or dangerous. The results may then require further manual transcription. Additionally, SVD is expensive because of the amount of expertise, time, and computational power required.

SUMMARY OF THE INVENTION

It is a general object of the present invention to provide a system for analyzing data of a repetitive occurrence that overcomes the disadvantages of the conventional methods.

It is another object of the present invention to provide a system for analyzing data of a repetitive occurrence that determines atypical data within a given domain.

It is still another object of the present invention to provide a system for analyzing data of a repetitive occurrence where atypical data is used to determine pre-cursors to exceedance events.

It is yet another object of the present invention to provide a system for analyzing data of a repetitive occurrence where the risk of an exceedance event is determined by analyzing how closely a given pattern matches the pre-cursor pattern.

It is yet another object of the present invention to provide a system for analyzing data of a repetitive occurrence where mitigating factors are determined by analyzing data sets that had pre-cursors to an exceedance event but in which the exceedance event did not occur.

It is another object of the present invention to provide a system for analyzing data of a repetitive occurrence where the consequences of an event are determined by analyzing the atypicality vectors of data sets after the occurrence of the event.

It is yet another object of the present invention to provide a system for analyzing data of a repetitive occurrence where mitigating factors are determined by analyzing data sets that had an event occurrence but in which specific consequences of that event did not occur.

In accordance with the objects described above, one aspect of the present invention includes a system for analyzing aircraft data that includes the steps of identifying a domain comprising sets of data, calculating ranges of typical values for components of the sets of data within the domain, and determining atypical components or each set of data within the sets of data based on the typical values calculated in the calculating step. In this aspect, the domain may be limited by identifying specific sets of data within the domain that relate to a specific event.

In another aspect of the present invention, the system for analyzing aircraft data can further include the step of determining atypical sets of data by (a) calculating a weight of the atypical components for each set of data within the sets of data, and (b) comparing the weight of each set of data to a distribution of the weights of all of the sets of data within the domain. A set of data is atypical if its weight is high with respect to the distribution of the weights of the sets of data within the domain.

In yet another aspect of the present invention, the system for analyzing aircraft data can also include the step of determining a pre-cursor pattern to an exceedance event by (a) identifying exceedance sets of data within the domain corresponding to an exceedance event, and (b) identifying common atypicalities of the exceedance sets of data. In this aspect, all components of the exceedance sets of data occurring after the exceedance event are ignored.

In still another aspect of the present invention, the system for analyzing aircraft data can further include the step of determining the risk of the occurrence of the exceedance event for a risky set of data within the domain by comparing atypicalities of the risky set of data with the pre-cursor pattern determined in the step of determining a pre-cursor pattern. In this aspect, all components of the exceedance sets of data occurring after the exceedance event are ignored, and the risk is proportional to the amount of correlation between the atypicalities of the risky set of data and the pre-cursor pattern.

In still another aspect of the present invention, the system for analyzing aircraft data can include the additional step of determining mitigating factors for an exceedance event by (a) identifying non-event sets of data within the domain in which atypicalities resembling the pre-cursor pattern exist but in which the exceedance event does not occur, and (b) identifying common atypicalities of the non-event sets of data. In this aspect, all components of the exceedance sets of data occurring after the exceedance event are ignored. Also, in this aspect, atypicalities of the pre-cursor pattern may be ignored.

In another aspect of the present invention, the system for analyzing aircraft data can also include the step of determining the consequences of an event by (a) identifying event sets of data in which the event occurred, and (b) identifying common atypicalities of the event sets of data after the occurrence of the event. In this aspect, the domain may be limited by identifying specific sets of data within the domain that relate to a specific event, all components of the event sets of data occurring before the event are ignored, and the consequences are the common atypicalities of the event sets of data.

In still another aspect of the present invention, the system for analyzing aircraft data can further include the step of determining mitigating factors for the consequences of the event by (a) chronologically sorting the common atypicalities of the event sets of data, and (b) identifying pairings of atypicalities comprising a mitigation and a consequence. A mitigation is identified if (a) the mitigation occurred but the later consequence usually does not occur or (b) the mitigation did not occur but the later consequence usually did occur. In this aspect, all components of the event sets of data occurring before the event are ignored.

According to yet another aspect of the present invention, a computer readable storage device contains computer executable code for a system for analyzing aircraft data The system may include the aspects discussed above.

According to still another aspect of the present invention, computer executable code is stored on a computer readable medium. The code includes code for a system for analyzing aircraft data according to the aspects discussed above.

According to another aspect of the present invention, a workstation for analyzing aircraft data, includes a memory having data of a repetitive occurrence stored thereon, and a processor including a system for analyzing aircraft data. The system may include any of the aspects discussed above.

These and other aspects, objects, and features of the present invention will become apparent from the following detailed description of the preferred embodiments, read in conjunction with and reference to the accompanying drawings.

DETAILED DESCRIPTION OF THE PREFERRED EMBODIMENTS

Pre-cursors, Atypicality, and Risk analysis (PAR) is a heuristic that integrates he concepts of pre-cursor determination, atypicality (deviations from the norm), and risk analysis. PAR can provide interactive response time, so that PAR analysis can be used even for ad hoc data exploration and analysis. An advantage of PAR is that atypical components of data are immediately identified and used to analyze causal factors.

Figure 1:
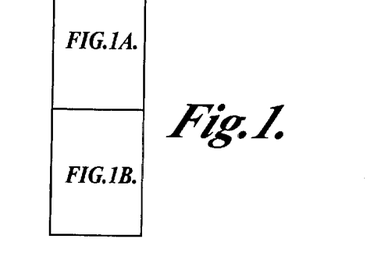
FIG. 1, as divided into FIGS. 1A and 1B for clarity, is a flow chart showing the system for analyzing data of a repetitive occurrence according to the present invention.
Figure 1A:
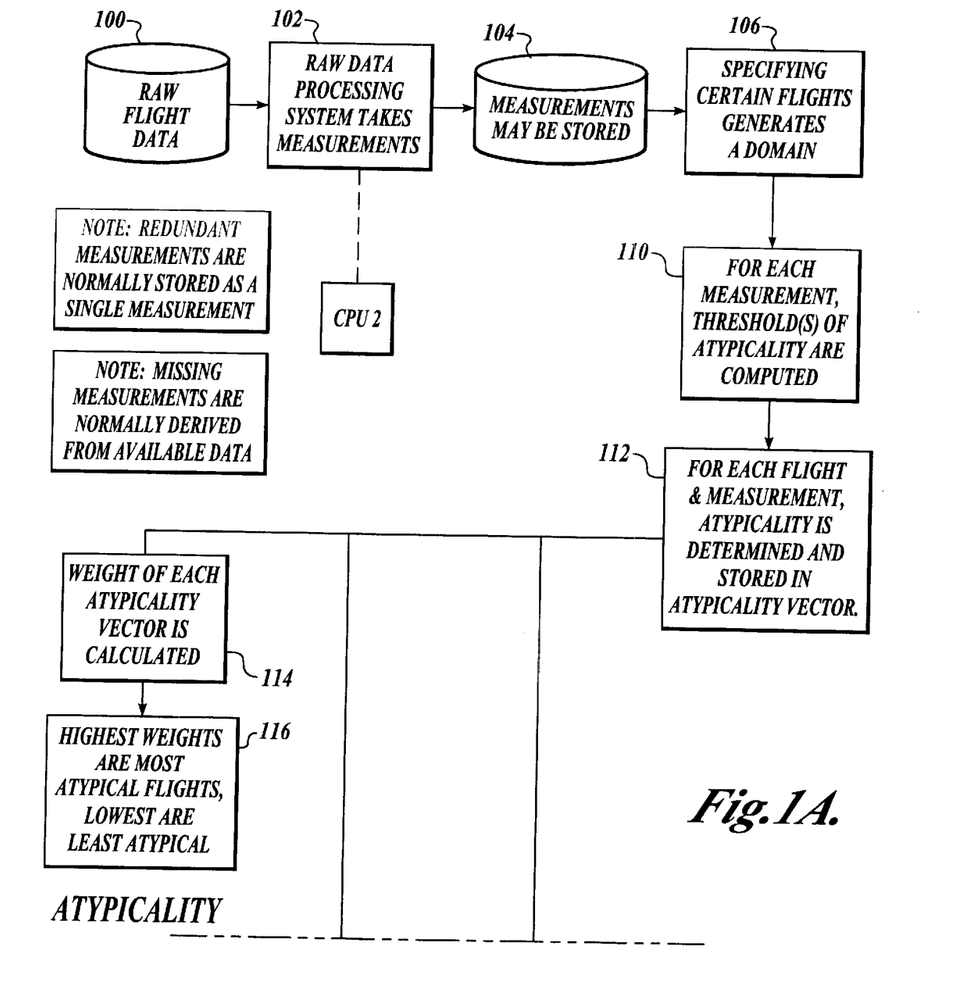
Figure 1B:
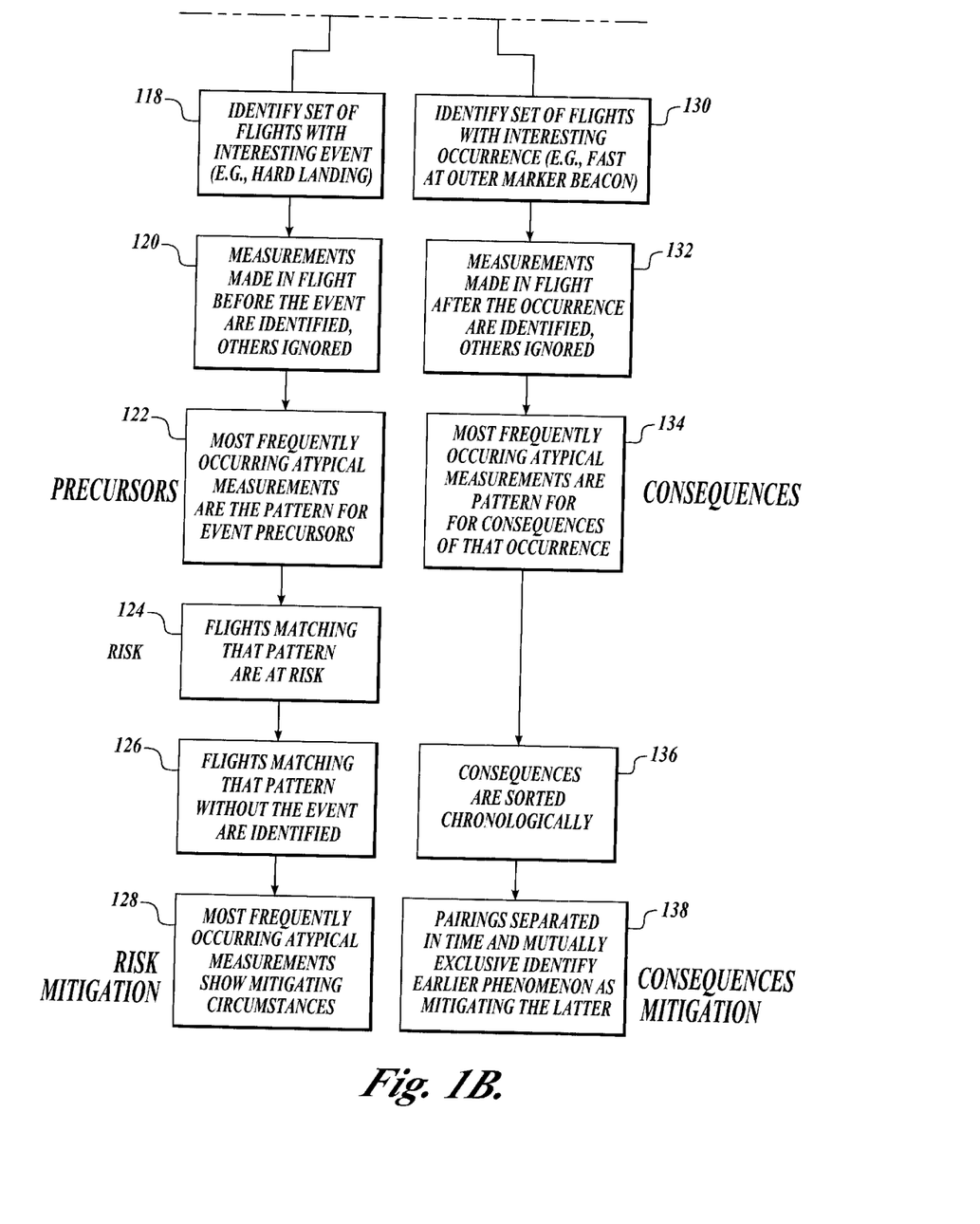

A system of analyzing data of a repetitive occurrence, such as aircraft flights, according to the present invention is illustrated in FIG. 1. Every aircraft flight produces raw flight data, Step 100, such as airspeed, engine power, aircraft configuration, and pitch rate, to name a few. This data is measured by a raw data processing system, Step 102, and may be stored in a database or the like, Step 104. It is preferable to record an abundance of data, rather than a minimal set. The measurements preferably include more than just those parameters that directly measure compliance with performance criteria. Other parameters that are operationally relevant and may contain an atypicality should also be measured. For example, in addition to directly measured parameters, it is more preferable to derive additional, physically significant parameters, such as kinetic and potential energy, height above touchdown, time before touchdown, total energy, speeds normalized for weight, and energy rates, even if those derived parameters are not used operationally. It may be necessary to generate the additional parameters to adequately describe physical phenomena. The data for each flight is preferably collected and stored in the form of a Summary Data Vector (SDV), which is a summary of all of the parameters of the flight.

Also in Step 104, the measurements may include or may be limited to sets of data corresponding to one or more "routine events" to be analyzed within the domain. A routine event is a well-defined occurrence on most flights. For example, liftoff, landing gear retraction, and passing the outer marker on final approach are appropriate for routine event designation. Routine events almost always have defined, acceptable performance criteria (standard operating procedures). For example, liftoff has speed and pitch rate criteria; gear retraction has speed criteria; and outer marker passage may have configuration and speed criteria. Also in Step 104, the measurements may include "scalar measures," i.e. measures of parameters over intervals. These may include average, minimum, maximum, change (such as for airspeeds), integrals, or any other interval measurements.

In Step 106, a group of data sets, or domain, is specified. This domain may be a set of flights or a set of occurrences, and the domain will be analyzed for individual flights that have atypical characteristics in relation to the other flights in the domain. The set of flights may be, for example, flights in June, 2000, flights landing at Chicago, B-737 flights, or other criteria or combinations of criteria.

Thresholds of atypicality for the data sets in the domain are then determined in Step 110. These thresholds are stored in the form of a threshold vector and are used to differentiate typical and atypical parameter measurement values for the domain identified in Step 106. In other words, for each routine event, typical characteristics are determined. In Step 110, sets of SDVs are processed en masse. For the distribution of each continuous parameter in the set of SDVs, upper and lower "outlier" threshold values are generated. The outlier threshold values set the outer limits of the standard operating measurements, beyond which a measurement is considered atypical. These outlier thresholds can be determined in a number of ways, such as from standard deviations, or from percentiles. For example, $10^{th}$ and $90^{th}$ percentiles can be generated for airspeed above a reference speed, Vref, at the outer marker (at the start of an approach). Each flight is then evaluated according to the threshold vector (atypicality) in Step 112. For each continuous parameter in the summary data vector for each flight, a comparison is made of the parameter with the typical value range of that parameter in the threshold vector. A component of an SDV is an "outlier," either high or low, when that component of the SDV is outside of the typical operating values for that parameter of the threshold vector. The results of these comparisons are stored in an atypicality vector for each flight. Thus, the data for specific flights is compared to the threshold vector to determine if individual measurements for that flight are atypical within the context of the domain.

Each measurement may be continuous, Boolean, or an enumeration (one of a set of legal values).

A continuous measurement is, by itself, considered atypical if it is at the top or bottom end of the distribution. The outlier thresholds can be calculated in a number of ways, such as by standard deviations (regardless of whether the distribution is Gaussian or not), by calculating percentiles, or by other statistical techniques. A continuous variable can have three states in the atypicality vector: atypical high, atypical low, or typical.

A Boolean variable is considered atypical, by itself, if the distribution is lopsided (for example 70:30, 80:20, 90:10, or the like) and the variable value is in the minority group, i.e. a rare occurrence.

A multi-valued discrete variable with N possible values is considered atypical if the variable value is any of the values with a probability much less than 1/N. For example, if there are 10 autopilot modes that might be used on an instrument approach, a uniform distribution of modes is for each mode to be active 10% of the time. Thus, one mode would be considered atypical if it was, for instance, active only 3% of the time, since 3% is much less than 10%. Just as in the Boolean case, a variable value is atypical if it is a rare occurrence.

The atypicality vector for each flight comprises all of the individual atypicalities of all of the individual measurements (parameters) for that flight. For clarity of discussion, the individual measurements are considered to be placed in the atypicality vector in the same chronological order that the measurements were made. A parameter that is atypical is assigned a "1" in the atypicality vector. A parameter that is typical is assigned a "0" in the atypicality vector. Thus, for each flight, its atypicality vector is a set of ones and zeros, indicating which of the parameters from that flight are outliers.

A central premise of PAR is that on atypical flights, there will be a relatively high number of parameter values that are outliers on their respective distributions, and have been individually detected to be atypical. In other words, an atypical flight has a relatively high count of ones in its atypical vector. In signal processing, the number of ones is called the "weight" of the vector. This weight is also called the Deviation from the Norm Index (DNI). The weight, or DNI, of each flight indicates the amount of its deviation from the norm, i.e. from the threshold vector.

Thus, to determine the most atypical flights in a domain, the weight of all atypicality vectors in that domain are calculated for each flight, Step 114. Atypical flights are then determined in Step 116 by comparing the weight (DNI) of each flight with the distribution of weights for the data sets in the domain. The most atypical flights, i.e. the ones with the greatest deviation from the norm, will have the highest weight (DNI). The least atypical flights will have the lowest weight (DNI).

DNIs can be pre-calculated, stored, and used in flight characteristics as search criteria. It is unlikely that any flight would have a DNI of 0. That measurement would indicate that no parameter of that flight was atypical. It is also not likely that a flight would have all ones in its atypicality vector.

For computational efficiency, continuous variables (which may have values of atypical high, atypical low, or typical) may appear twice in the atypicality vector, with one bit for atypical high/typical, and the other bit for atypical low/typical. Thus, if there are C continuous measurements, B Boolean, and M multi-valued measurements, the atypicality vector would have 2*C+B+M entries, each entry being a 1 or 0, or equivalently, a true or a false.

A limitation of the above approach is that depending upon how the set of measurements are chosen, some phenomena may be given additional emphasis. For example, in jet aircraft, high engine power can be reflected in 5 parameters per engine: exhaust pressure ratio (EPR), exhaust gas temperature (EGT), fuel flow, and two fan speeds. On a twin-engine airplane, the number of measurements reflecting the single phenomenon of high power may then be doubled with 10 parameters being atypical, when in fact only a single phenomenon is occurring. There are several ways of handling this undesirable occurrence. One way is to assign a weight to each element in the atypicality vector, and to multiply each "1" in the atypicality vector by the corresponding weight. Other ways are to perform correlations among the atypicality vectors or to manually inspect the parameters.

In Step 118, atypical flights within the domain having a specific "exceedance event" are determined. Examples of exceedance events are a hard landing, an engine over-temperature event, excessive bank angle, flap extension above the placarded airspeed limit, deviations from the localizer or glideslope, or altitude deviation.

Of the atypical flights with a specific exceedance event identified in Step 118, their atypicality vectors are analyzed in Step 120 to determine the atypical components of the atypicality vector measured in flight prior to the event. Other components are ignored, yielding a truncated atypicality vector.

In Step 122, the truncated atypicality vectors are compared with each other to identify individual atypicality vector components common to the flights having the exceedance event. These common atypicality vector components are pre-cursors to the exceedance event.

For example, suppose the domain contained 1000 flights, and 50 flights manifested a given exceedance event. Within just those 50 flights, the individual elements in the atypicality vectors that contained the most "1"s are determined. Those measurements indicate the common elements that are most atypical within the set of 50 flights over the given domain. Ideally, with clean data, the atypical elements would show up in all or nearly all of the atypical flights, and other elements of the atypicality vector would have only a moderate number of occurrences.

PAR also generates a measure of the risk of specific events. Once the pre-cursors are identified for flights that have the exceedance event, a comparison is made with other flights to determine the risk of the exceedance event, Step 124. Flights that have or closely resemble the pre-cursor pattern are considered at risk of having the exceedance event. More explicitly, to find risk for a given flight, first define a pre-cursor pattern. The pre-cursor pattern is a list of atypicality vector components that were found to be present in a high proportion of the flights with the exceedance event. With the pre-cursor pattern defined, the following algorithm is used to search for the flights at risk: Count the number of bits which have a value of one in both the atypicality vector for the given flight and in the pre-cursor pattern. The higher that number of bits, the greater the risk. Optionally, risk can be defined by an index by taking that number of bits and dividing it by the weight of the pre-cursor pattern (that is, the number of bits in the risk pattern). The closer that quotient is to 1, the greater the risk.

There will be some number of flights that were at risk of the given exceedance event, but on which the given exceedance event not occur. Mitigating circumstances may have caused that event not to occur. To identify these mitigating circumstances, the truncated atypicality vectors (retaining the atypicality data from measurements occurring in flight before the exceedance event) for flights which were at risk but on which the given exceedance event did not occur are identified in Step 126. Then, in each atypicality vector, all bits of the risk pattern are zeroed out. The most common remaining bits are identified as the mitigating factors, Step 128.

When a particular event occurs, whether a "good" event or a "bad" event, there may be atypical consequences of that event. Those consequences are found with a simple modification of the above techniques. First, a set of flights having the event are identified in Step 130, and then the atypicality vectors of these flights are truncated by retaining only bits based on measurements that occurred in flight after the event, Step 132. The most common atypical measurements after the event are then identified as the consequences of the event, Step 134.

Mitigating circumstances, as discussed above, may also control the consequences of an event. To find the mitigating factors, the atypicalities of the flights having the event are sorted chronologically, Step 136. Then, pairings of atypicalities comprising a mitigation and a consequence are identified, Step 138. A mitigation/consequence pairing is identified if (a) the mitigation occurs but, in the majority of the flights, a later consequence does not occur or (b) the mitigation does not occur but, in the majority of the flights, a later consequence does occur. In this aspect, all components of the exceedance sets of data occurring before the event are ignored.

Pre-cursors, mitigation, and consequences are never constrained to be single exceedance measurements. Each may be a pattern of multiple elements of the atypicality vector.

A general example of PAR will now be described. To find precursors to hard landings, it is first necessary to identify the domain that is to be examined. For example, B737 (Boeing 737 jet aircraft) hard landing pre-cursors would be based on atypicality vectors calculated from a set of flights that include B737 flights. Other types of aircraft flights would be excluded. Threshold vectors for standard operations of the flights in the domain are calculated. Sets of flights within the domain having the exceedance event of a hard landing are identified. The atypicality vectors for these flights are then examined for atypical components. The pre-cursors to the hard landings are identified as the common atypical components. For example, if most of the hard landing flights had late flap extension, i.e. a low number of seconds before touchdown, and landing flap selection time to touchdown was below the $10^{th}$ percentile, then late flap extension is considered a pre-cursor to hard landings.

Thus, pre-cursors are calculated by taking the set of symptom flights (flights with hard landings) and comparing their atypicality vectors. Individual components in the atypicality vectors that are common among the flights with hard landings are considered pre-cursors, i.e. most flights with hard landings had outliers for those parameters.

The risk of a hard landing occurring on a particular flight is determined by comparing the atypicality vector of that flight with the pre-cursor pattern identified above. Flights that closely resemble that pre-cursor pattern are considered to be at higher risk of hard landings. If the pre-cursor patterns occur frequently enough, they may provide a meaningful probability of occurrence. That probability of occurrence, combined with the number of flights per time interval, gives a measure of the rate of occurrence.

To determine mitigating parameters, flights that did not have hard landings but which had an atypicality vector closely resembling the pre-cursor pattern are identified. By correlating the atypicality vectors from those flights, and removing the factors that generated the risk, the remaining factors may indicate mitigating circumstances.

EXAMPLE 1

Figure 2:
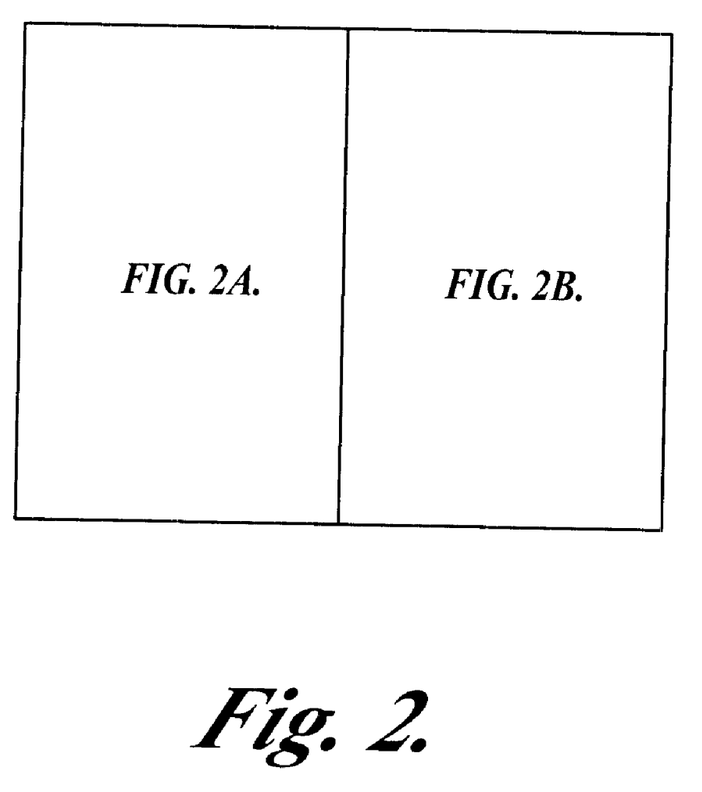
FIG. 2, as divided into FIGS. 2A and 2B for clarity, is a table of data relating to an Example 1 of the present invention.
Figure 2A:
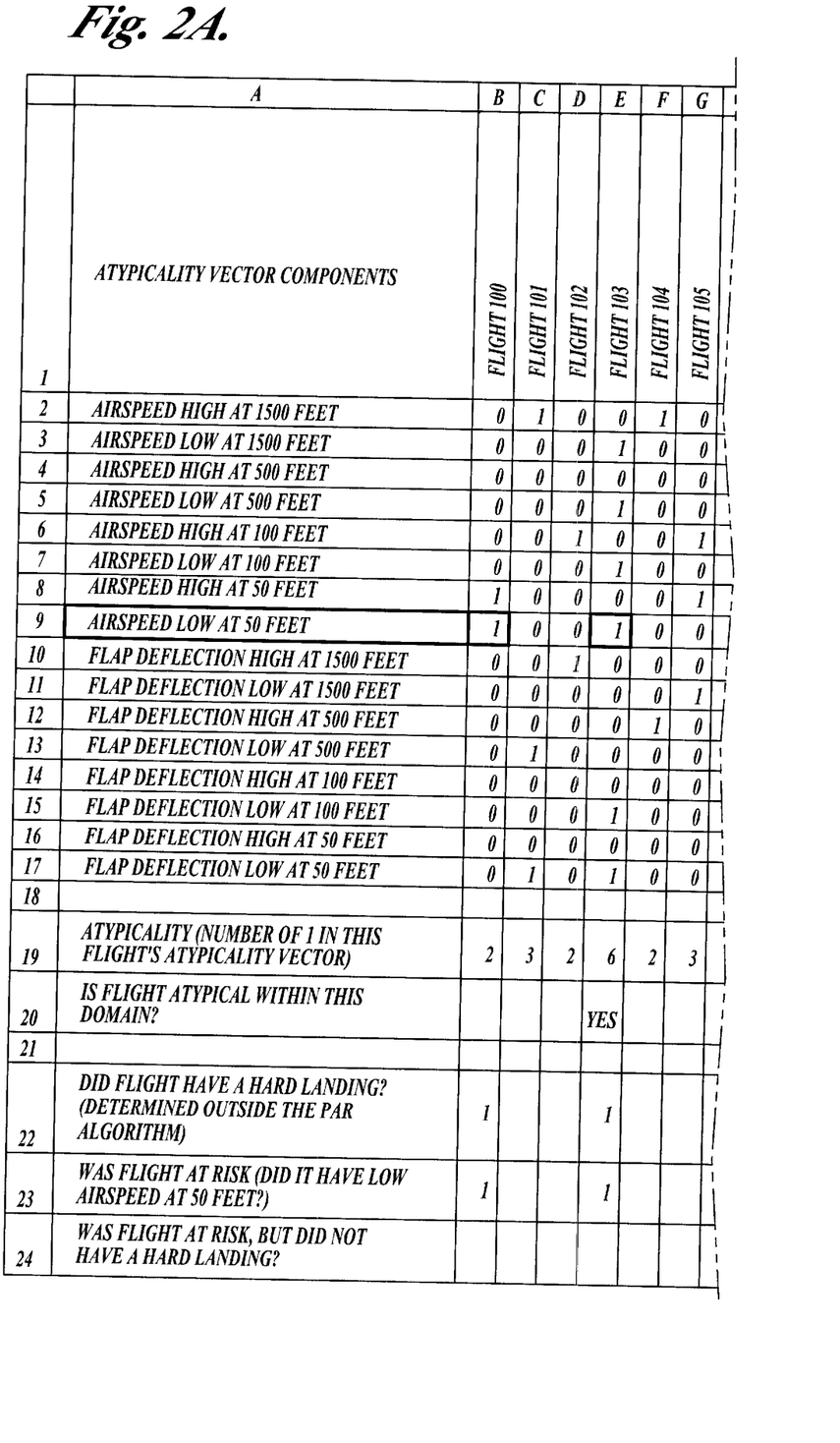
Figure 2B:
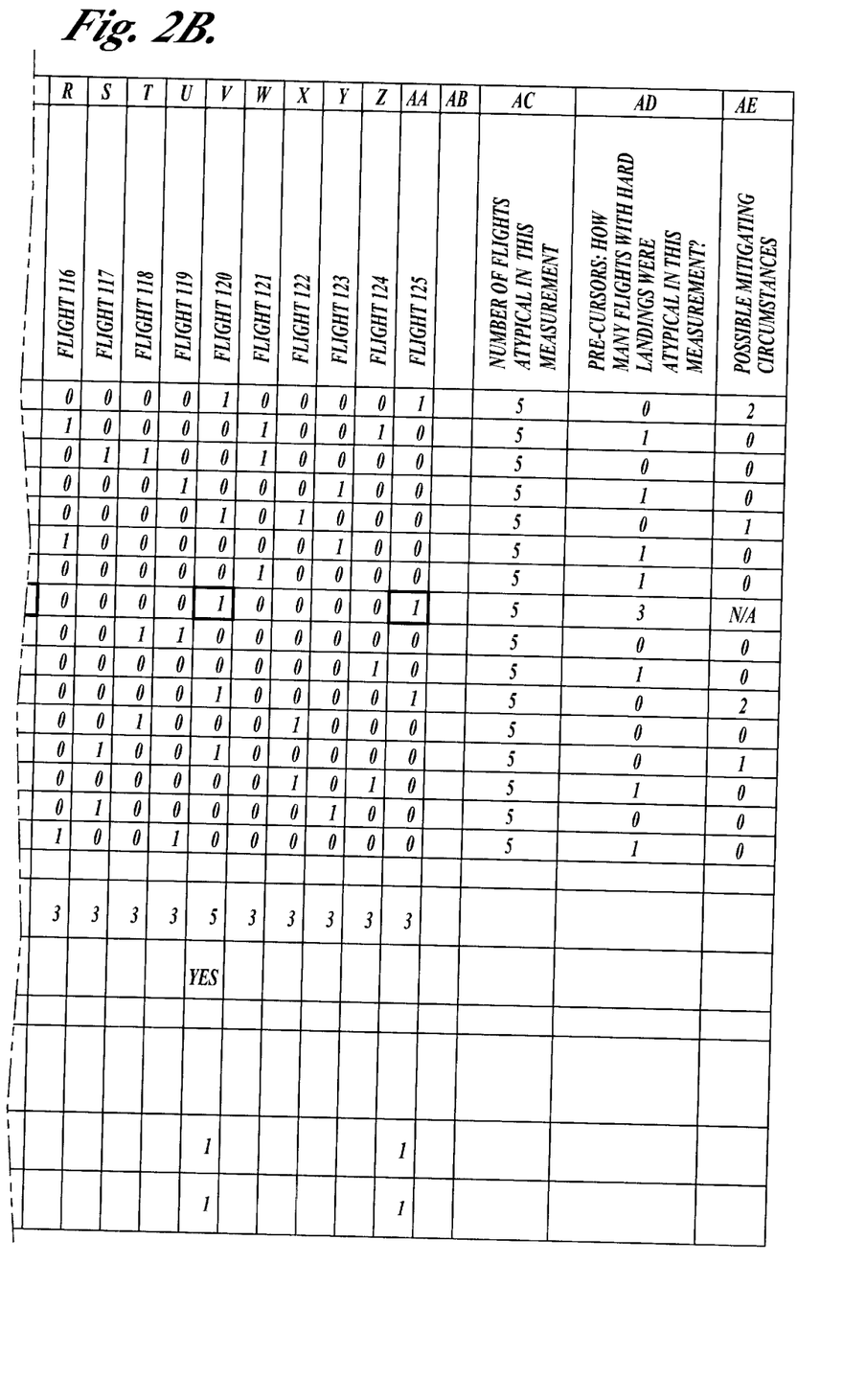

Example 1 will now be described with reference to the table in FIG. 2. The domain of Example 1 includes 26 flights, numbered 100–125. For each flight, measurements were taken for the atypicality vector components shown in column A. From these measurements, thresholds of atypicality (the threshold vector) were determined for each component (not shown). The measurements for each flight were then compared to the threshold vector to determine the atypicality for each flight. If a component was atypical, it was assigned a "1." If the component was not atypical, it was assigned a "0." Column AC indicates that consistent numbers of atypical measurements were obtained according to each of the vector components, as expected. Row 19 provides a total of the atypical measurements for each flight, i.e. the weight of each atypicality vector. The most atypical flights in the domain are then determined by comparing the weight of individual flights with the weight distribution of the domain, Row 20.

The exceedance event for Example 1 is a hard landing. Thus, the flights having a hard landing are identified (determined outside of PAR). Three flights within the domain had hard landings (Row 22). By comparing the atypicality vectors of these three flights, it was determined that they all had the atypical component of Airspeed low at 50 feet (see Column AD and Row 9). Thus, PAR identifies Airspeed low at 50 feet as a pre-cursor to hard landings because of the high value in Column AD. Additionally, two flights had Airspeed low at 50 feet but did not have a hard landing (see Column V, Column AA, and Row 24). As shown in Column AE, these two flights shared the common atypicalities of Airspeed high at 1500 feet (Row 2) and Flap deflection high at 500 feet (Row 12). Thus, PAR identifies these components as possible mitigating factors.

Pre-cursors search backwards in data for patterns that may predict a bad outcome, i.e. the outcome implies the antecedent, but not vice versa. For example, if the aircraft touches down too fast, it was probably fast on the approach. However, the aircraft can be fast on the approach and not touch down fast. On the other hand, consequences are the converse of pre-cursors, and the flight is searched forward for bad outcomes that may arise later on. For example, if excessive speed is detected at the start of an approach gate, a consequence might be a long landing or excessive touchdown speed. For consequences, the antecedent implies the result, but not vice versa. There can be multiple causes of the result. For example, an aircraft slow on short final makes hard landings more likely, but an aircraft can have a hard landing without being slow on final.

A priori knowledge can be added to PAR in determining outliers. For example, an EPR can be specified as to a range of 20% to 103%, with bin widths of 1%, so that the outlier algorithm does not have to start with absolutely no knowledge of the distribution of parameters.

Cross fleet deviations from the norm require modifications of fleet-specific summary data vectors to a lowest common denominator. Different autopilot modes, different engine instruments (some with EPR, some without), different flight techniques (managed approach speed versus Vref), all must be handled. Cross fleet summary data vectors can be used, along with a cross fleet norm vector, to perform cross fleet analysis.

Parameter maps (i.e. which parameters are recorded in flight, how frequently they are measured, and other characteristics) will change over time. In general, changes will normally be minor (except for the ideal case of changing from a traditional accident investigation parameter map to an operationally oriented parameter map). When only minor changes are involved, those parameters not present in both the before and after parameter maps can likely be ignored, with little effect on the atypicality vectors.

It is preferable to use PAR with a user interface that presents PAR to the analyst and allows that analyst to exploit PAR functionalities. As will be appreciated by those skilled in the art, the systems, methods, and procedures described herein can be embodied in a programmable computer (see CPU 2 in FIG. 1) or in computer executable software. The software can be stored on computer readable media, for example, on a floppy disk, RAM, ROM, a hard disk, removable media, flash memory, memory sticks, optical media, magneto-optical media, CD-ROMs, etc.

PAR analysis can answer the following kinds of questions:

1. For any one kind of exceedance event, what are the pre-cursors to that exceedance event?
2. For any one kind of exceedance event, what are environmental indicators of that exceedance event, such as airport, runway, winds, or gross weight?
3. For any one kind of exceedance or other event, what deviations from the norm typically follow that event? In other words, what are the typical consequences of an exceedance event?
4. At which airports are approaches different from the system wide norms?
5. In any given time period at any one airport, did operations deviate from the system wide norm more or less than normal?
6. For any given set of flights, what patterns do they share, whether those patterns are pre-cursors, consequences, or environment?

As will be appreciated from the foregoing discussion, PAR is a heuristic designed to identify possible patterns in flight data, so that a human analyst can proceed with detailed causal analysis. PAR is computationally inexpensive and fast enough to generate useful functionality interactively. The events on which PAR works are rare in sample sets, so there is frequently not enough data to employ standard statistical methods. There may be questions for which standard statistical methods are appropriate and PAR is not. For example, comparing touchdown speeds at multiple airports is best answered by standard statistical methods. There can also be synergies between PAR and conventional statistical measures. PAR may be able to help generate risk and rate of occurrence measures from rare events. For events that happen more frequently, where conventional statistics apply, PAR may be able to help discriminate among similar phenomena to identify sub-classes of events.

Specification of which airport, approach, or runway does not directly fit the PAR outlier model. For a given set of flights, such as hard landings, searches will be made for high and low rate of occurrence by airport, and for lopsided distribution (for example, most were at Chicago, even though the rate was low).

In flight data and in other data, it is generally not the case that all events will influence all future events. For example, the details of taking off in New York, such as taking off 5 knots fast, would not be expected to influence the arrival in Los Angeles. It is therefore appropriate to subdivide a flight into multiple phases, i.e. approach and landing phases, and to divide the atypicality vector into multiple parts.

For other kinds of operations, it may be appropriate to divide the atypicality vector in different ways, and into a different number of parts. For example, other possibilities include non-flight operations or sub-systems on a flight, such as hydraulics, engines, or even cabin service.

Although specific embodiments of the present invention have been described above in detail, it will be understood that this description is merely for purposes of illustration. Various modifications of and equivalent steps corresponding to the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

I claim:

1. A method for analyzing aircraft data, comprising the steps of:

identifying a domain comprising sets of data;

calculating, from said sets of data, ranges of typical values for components of the sets of data within the domain; and determining atypical components for each set of data within the sets of data based on the typical values calculated in said calculating step.

2. The method for analyzing aircraft data according to claim 1, further comprising the step of:

determining atypical sets of data by (a) calculating a weight of the atypical components for each set of data within the sets of data, and (b) comparing the weight of each set of data to a distribution of the weights of all of the sets of data within the domain, wherein a set of data is atypical if its weight is high with respect to the distribution of the weights of the sets of data within the domain.

3. The method for analyzing aircraft data according to claim 1, wherein the domain is limited by identifying specific sets of data within the domain that relate to a specific event.

4. The method for analyzing aircraft data according to claim 3, further comprising the step of:
   determining a pre-cursor pattern to an exceedance event by (a) identifying exceedance sets of data within the domain corresponding to an exceedance event, and (b) identifying common atypicalities of the exceedance sets of data,
   wherein all components of the exceedance sets of data occurring after the exceedance event are ignored.

5. The method for analyzing aircraft data according to claim 4, further comprising the step of:
   determining the risk of the occurrence of the exceedance event for a risky set of data within the domain by comparing atypicalities of the risky set of data with the pre-cursor pattern determined in said step of determining a pre-cursor pattern,
   wherein the risk is proportional to the amount of correlation between the atypicalities of the risky set of data and the pre-cursor pattern.

6. The method for analyzing aircraft data according to claim 4, further comprising the step of:
   determining mitigating factors for an exceedance event by (a) identifying non-event sets of data within the domain in which atypicalities resembling the pre-cursor pattern exist but in which the exceedance event does not occur, and (b) identifying common atypicalities of the non-event sets of data as the mitigating factors.

7. The method for analyzing aircraft data according to claim 6, wherein atypicalities of the pre-cursor pattern are ignored.

8. The method for analyzing aircraft data according to claim 3, further comprising the step of:
   determining the consequences of an event by (a) identifying event sets of data corresponding to the event, and (b) comparing the atypicalities of the event sets of data with the typical values,
   wherein all components of the event sets of data occurring before the event are ignored, and
   wherein the consequences are the common atypicalities of the event sets of data.

9. The method for analyzing aircraft data according to claim 8, further comprising the step of:
   determining mitigating factors for the consequences of the event by (a) chronologically sorting the common atypicalities of the event sets of data, and (b) identifying pairings of atypicalities comprising a mitigation and a consequence,
   wherein a mitigating factor is a mitigation that occurred when a later consequence did not occur in a majority of the flights or is a mitigation that did not occur when a later consequence did occur in a majority of the flights.

10. A computer readable storage device containing computer executable code for a system for analyzing aircraft data, said device including code for executing steps comprising:
    identifying a domain comprising sets of data;
    calculating, from said sets of data, ranges of typical values for components of the sets of data within the domain; and
    determining atypical components for each set of data within the sets of data based on the typical values calculated in said calculating step.

11. A computer readable storage device according to claim 10, said device including code for further executing the step comprising:
    determining atypical sets of data by (a) calculating a weight of the atypical components for each set of data within the sets of data, and (b) comparing the weight of each set of data to a distribution of the weights of all of the sets of data within the domain,
    wherein a set of data is atypical if its weight is high with respect to the distribution of the weights of the sets of data within the domain.

12. A computer readable storage device according to claim 10, wherein the domain is limited by identifying specific sets of data within the domain that relate to a specific event.

13. A computer readable storage device according to claim 12, said device including code for further executing the step comprising:
    determining a pre-cursor pattern to an exceedance event by (a) identifying exceedance sets of data within the domain corresponding to an exceedance event, and (b) identifying common atypicalities of the exceedance sets of data,
    wherein all components of the exceedance sets of data occurring after the exceedance event are ignored.

14. A computer readable storage device according to claim 13, said device including code for further executing the step comprising:
    determining the risk of the occurrence of the exceedance event for a risky set of data within the domain by comparing atypicalities of the risky set of data with the pre-cursor pattern determined in said step of determining a pre-cursor pattern,
    wherein the risk is proportional to the amount of correlation between the atypicalities of the risky set of data and the pre-cursor pattern.

15. A computer readable storage device according to claim 13, said device including code for further executing the step comprising:
    determining mitigating factors for an exceedance event by (a) identifying non-event sets of data within the domain in which atypicalities resembling the pre-cursor pattern exist but in which the exceedance event does not occur, and (b) identifying common atypicalities of the non-event sets of data as the mitigating factors.

16. A computer readable storage device according to claim 15, wherein atypicalities of the pre-cursor pattern are ignored.

17. A computer readable storage device according to claim 12 said device including code for further executing the step comprising:
    determining the consequences of an event by (a) identifying event sets of data corresponding to the event, and (b) comparing the atypicalities of the event sets of data with the typical values,
    wherein all components of the event sets of data occurring before the event are ignored, and
    wherein the consequences are the common atypicalities of the event sets of data.

18. A computer readable storage device according to claim 17, said device including code for further executing the step comprising:
    determining mitigating factors for the consequences of the event by (a) chronologically sorting the common atypicalities of the event sets of data, and (b) identifying pairings of atypicalities comprising a mitigation and a consequence, wherein a mitigating factor is a mitigation that occurred when a later consequence did not occur in a majority of the flights or is a mitigation that did not occur when a later consequence did occur in a majority of the flights.

19. Computer executable code stored on a computer readable medium implementing a system for analyzing aircraft data, said code for executing the steps comprising:

identifying a domain comprising sets of data;

calculating from said sets of data, ranges of typical values for components of the sets of data within the domain; and determining atypical components for each set of data within the sets of data based on the typical values calculated in said calculating step.

20. Computer executable code stored on a computer readable medium according to claim 19, said code for further executing the step comprising:

determining atypical sets of data by (a) calculating a weight of the atypical components for each set of data within the sets of data, and (b) comparing the weight of each set of data to a distribution of the weights of all of the sets of data within the domain, wherein a set of data is atypical if its weight is high with respect to the distribution of the weights of the sets of data within the domain.

21. Computer executable code stored on a computer readable medium according to claim 19, wherein the domain is limited by identifying specific sets of data within the domain that relate to a specific event.

22. Computer executable code stored on a computer readable medium according to claim 21, said code for further executing the step comprising:

determining a pre-cursor pattern to an exceedance event by (a) identifying exceedance sets of data within the domain corresponding to an exceedance event, and (b) identifying common atypicalities of the exceedance sets of data, wherein all components of the exceedance sets of data occurring after the exceedance event are ignored.

23. Computer executable code stored on a computer readable medium according to claim 22, said code for further executing the step comprising:

determining the risk of the occurrence of the exceedance event for a risky set of data within the domain by comparing atypicalities of the risky set of data with the pre-cursor pattern determined in said step of determining a pre-cursor pattern, wherein the risk is proportional to the amount of correlation between the atypicalities of the risky set of data and the pre-cursor pattern.

24. Computer executable code stored on a computer readable medium according to claim 22, said code for further executing the step comprising:

determining mitigating factors for an exceedance event by (a) identifying non-event sets of data within the domain in which atypicalities resembling the pre-cursor pattern exist but in which the exceedance event does not occur, and (b) identifying common atypicalities of the non-event sets of data as the mitigating factors.

25. Computer executable code stored on a computer readable medium according to claim 24, wherein atypicalities of the pre-cursor pattern are ignored.

26. Computer executable code stored on a computer readable medium according to claim 21, said code for further executing the step comprising:

determining the consequences of an event by (a) identifying event sets of data corresponding to the event, and (b) comparing the atypicalities of the event sets of data with the typical values, wherein all components of the event sets of data occurring before the event are ignored, and wherein the consequences are the common atypicalities of the event sets of data.

27. Computer executable code stored on a computer readable medium according to claim 26, said code for further executing the step comprising:

determining mitigating factors for the consequences of the event by (a) chronologically sorting the common atypicalities of the event sets of data, and (b) identifying pairings of atypicalities comprising a mitigation and a consequence, wherein a mitigating factor is a mitigation that occurred when a later consequence did not occur in a majority of the flights or is a mitigation that did not occur when a later consequence did occur in a majority of the flights.

28. A workstation for analyzing aircraft data stored on a memory, comprising:

a processor including a system for analyzing aircraft data, said system comprising:

means for identifying a domain comprising sets of data;

means for calculating, from said sets of data, ranges of typical values for components of the sets of data within the domain; and means for determining atypical components for each set of data within the sets of data based on the typical values calculated in said calculating means.

29. A workstation for analyzing aircraft data according to claim 28, said system further comprising:

means for determining atypical sets of data by (a) calculating a weight of the atypical components for each set of data within the sets of data, and (b) comparing the weight of each set of data to a distribution of the weights of all of the sets of data within the domain, wherein a set of data is atypical if its weight is high with respect to the distribution of the weights of the sets of data within the domain.

30. A workstation for analyzing aircraft data according to claim 28, further comprising identifying means for limiting the domain to specific sets of data within the domain that relate to a specific event.

31. A workstation for analyzing aircraft data according to claim 30, said system further comprising:

means for determining a pre-cursor pattern to an exceedance event by (a) identifying exceedance sets of data within the domain corresponding to an exceedance event, and (b) identifying common atypicalities of the exceedance sets of data, wherein all components of the exceedance sets of data occurring after the exceedance event are ignored.

32. A workstation for analyzing aircraft data according to claim 31, said system further comprising:

means for determining the risk of the occurrence of the exceedance event for a risky set of data within the domain by comparing atypicalities of the risky set of data with the pre-cursor pattern determined in said step of determining a pre-cursor pattern, wherein the risk is proportional to the amount of correlation between the atypicalities of the risky set of data and the pre-cursor pattern.

33. A workstation for analyzing aircraft data according to claim 31, said system further comprising:

means for determining mitigating factors for an exceedance event by (a) identifying non-event sets of data within the domain in which atypicalities resembling the pre-cursor pattern exist but in which the exceedance event does not occur, and (b) identifying common atypicalities of the non-event sets of data as the mitigating factors.

34. A workstation for analyzing aircraft data according to claim 33, wherein said means for determining mitigating factors further includes (c) ignoring atypicalities of the pre-cursor pattern.

35. A workstation for analyzing aircraft data according to claim 30, said system further comprising:
  means for determining the consequences of an event by (a) identifying event sets of data corresponding to the event, and (b) comparing the atypicalities of the event sets of data with the typical values,
  wherein all components of the event sets of data occurring before the event are ignored, and
  wherein the consequences are the common atypicalities of the event sets of data.

36. A workstation for analyzing aircraft data according to claim 35, said system further comprising:
  means for determining mitigating factors for the consequences of the event by (a) chronologically sorting the common atypicalities of the event sets of data, and (b) identifying pairings of atypicalities comprising a mitigation and a consequence,
  wherein a mitigating factor is a mitigation that occurred when a later consequence did not occur in a majority of the flights or is a mitigation that did not occur when a later consequence did occur in a majority of the flights.

* * * * *